United States Patent
Rehder et al.

(10) Patent No.: US 9,741,474 B2
(45) Date of Patent: Aug. 22, 2017

(54) TWO-PART SNAP-TOGETHER FEEDTHROUGHS

(71) Applicant: The Boeing Company, Chicago, IL (US)

(72) Inventors: Eric M. Rehder, Los Angeles, CA (US); Dale H. Waterman, Rancho Cucamonga, CA (US); John Steven Frost, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/153,461

(22) Filed: May 12, 2016

(65) Prior Publication Data

US 2017/0092393 A1 Mar. 30, 2017

Related U.S. Application Data

(60) Provisional application No. 62/233,254, filed on Sep. 25, 2015.

(51) Int. Cl.
*H02G 3/18* (2006.01)
*H01B 17/58* (2006.01)
*H01B 17/26* (2006.01)

(52) U.S. Cl.
CPC .............. *H01B 17/58* (2013.01); *H01B 17/26* (2013.01)

(58) Field of Classification Search
CPC ......... H01B 17/56; H01B 17/58; H01B 17/26
USPC ....................................................... 174/650
See application file for complete search history.

(56) References Cited

U.S. PATENT DOCUMENTS

| 4,525,000 A * | 6/1985 | Bachle | H02G 3/0675 174/653 |
| 6,034,325 A * | 3/2000 | Nattel | H01R 9/03 174/59 |
| 2005/0109523 A1 | 5/2005 | Snyder | |
| 2011/0309071 A1* | 12/2011 | Lin | H02G 3/088 220/3.2 |
| 2015/0047898 A1* | 2/2015 | Sagdic | H01R 13/506 174/657 |

FOREIGN PATENT DOCUMENTS

| DE | 4212563 | 10/1993 |
| DE | 20218979 | 4/2004 |
| EP | 1 627 581 A1 | 2/2006 |
| WO | WO 2010/092101 | 8/2010 |

* cited by examiner

*Primary Examiner* — Sherman Ng
(74) *Attorney, Agent, or Firm* — Haynes and Boone, LLP (57) ABSTRACT

A two-part, snap-together feedthrough for feeding signals through a panel having opposite sides includes first and second parts, each including a flange with an opening therethrough, and a tubular segment that extends normally from a first surface of the flange and has a lumen disposed generally concentrically with the opening. A pair of complementary engaging mechanisms are respectively on distal end portions of the tubular segments and configured to couple the first and second parts together through an opening in the panel in a snap-together fashion, such that the first surface of each of the flanges is held adjacent to a corresponding one of the opposite sides of the panel, and the lumens of respective ones of the tubular segments are disposed generally concentrically with each other.

20 Claims, 10 Drawing Sheets

TWO-PART SNAP-TOGETHER FEEDTHROUGHS

CROSS-REFERENCE TO RELATED APPLICATIONS

This application claims priority to and the benefit of U.S. Provisional Patent Application No. 62/233,254 filed Sep. 25, 2015 and entitled "TWO-PART SNAP-TOGETHER FEEDTHROUGHS" which is hereby incorporated by reference in its entirety.

BACKGROUND

1. Technical Field

This disclosure relates to feedthroughs, in general, and in particular, to two-part, snap-together feedthroughs for enabling signals, e.g., electrical signals, to be conveyed from one side of a panel to the other side of the panel.

2. Related Art

In a number of fields, it is often necessary to convey a signal, e.g., an electrical signal, from one to the other side of a wall, barrier, tank or other boundary. For example, in the case of solar cell panels used on, e.g., orbital satellites and the like, the panels can be relatively thick (typically 1-3 cm), and can incorporate an electroconductive honeycomb core, e.g., aluminum, for strength and stiffness. One side of the panels can be populated with solar cells, while the opposite, or backside of the panels can incorporate circuitry and associated wiring, e.g., power and switching interconnects, for the cells. The wires conveying electrical signals between the cells and the backside circuitry typically pass through the panel, rather than around its edges, and therefore need to be protected from any sharp edges located within the panel and adjacent to the opening through which they pass.

Currently, interconnects between the front and back surfaces of the panel are made by inserting a piece of tubing cut to length slightly greater than the thickness of the panel. The tubing is then bonded to front and back faces of the panel. This approach has some drawbacks, in that it is laborious and time-consuming to implement, and incurs the risk of shorting the conductor(s) of the wire to the panel. Accordingly, a need exists in the industry for improved techniques for feedthroughs (e.g., including interconnects).

SUMMARY

In accordance with examples of the present disclosure, novel, two-piece, snap-together feedthroughs are disclosed, together with methods for making and using them, that are reliable, inexpensive, simple to install, that protect wires passing through them from sharp edges in the panel and around the termination hole, and optionally, can include a conductive path that enables a signal to pass through the panel without the use of separate wires.

In one example, a two-part, snap-together feedthrough for feeding signals through a panel having opposite surfaces comprises first and second parts, each including a flange with an opening therethrough, and a tubular segment that extends normally from a first surface of the flange and has a lumen disposed generally concentrically with the opening. A pair of complementary engaging mechanisms are respectively disposed on distal end portions of the tubular segments and configured to couple the first and second parts together through an opening in the panel in a snap-together fashion, such that the first surface of each of the flanges is held adjacent to a corresponding one of the opposite surfaces of the panel, and the lumens of respective ones of the tubular segments are disposed generally concentrically with each other.

In another example, a method comprises forming a hole through a panel having opposite sides and providing a feedthrough. The feedthrough comprises first and second parts, each including a flange with an opening therethrough, and a tubular segment extending normally from a first surface of the flange. Each tubular segment has a lumen disposed generally concentrically with the opening in the associated flange, and a pair of complementary engaging mechanisms, respectively disposed on distal end portions thereof and configured to couple the first and second parts together when pressed into engagement with each other longitudinally within the hole. Respective ones of the tubular segments of the first and second parts are inserted into opposite ends of the hole, and the two parts are pressed towards each other, such that the engaging mechanisms engage each other in a complementary snap-together fashion and couple the first and second parts together through the opening, the first surface of each of the flanges is held adjacent to a corresponding one of the opposite surfaces of the panel, and the lumens of respective ones of the tubular segments are disposed generally concentrically with each other.

Advantageously, an electrical signal is conveyed through the feedthrough from one side of the panel to the other side thereof by inserting an electroconductive wire through the concentric lumens of the tubular segments of the two parts, or alternatively, by forming a pair of electroconductive paths, each disposed on an interior surface of a respective one of the lumens of the two tubular segments, and electroconductively connecting the electroconductive paths to each other when the first and second parts are coupled together through the opening A better understanding of the two-part, snap-together feedthroughs of the present disclosure, as well as an appreciation of example methods for making and using them, will be afforded to those of skill in the art by a consideration of the following detailed description of one or more examples thereof. In this description, reference will be made to the various views of the appended sheets of drawings, which are briefly described below, and within which, like reference numerals are used to identify like ones of the elements illustrated therein.

DETAILED DESCRIPTION

In accordance with the present disclosure, examples of novel, two-piece, snap-together feedthroughs are disclosed, together with methods for making and using them, that are reliable, inexpensive, quick and easy to install, that protect wires passing through them from sharp edges in the panel and around the termination hole, and optionally, that can include conductive paths that enable signals to pass through the panel without the use of conventional wires.

Figure 1:
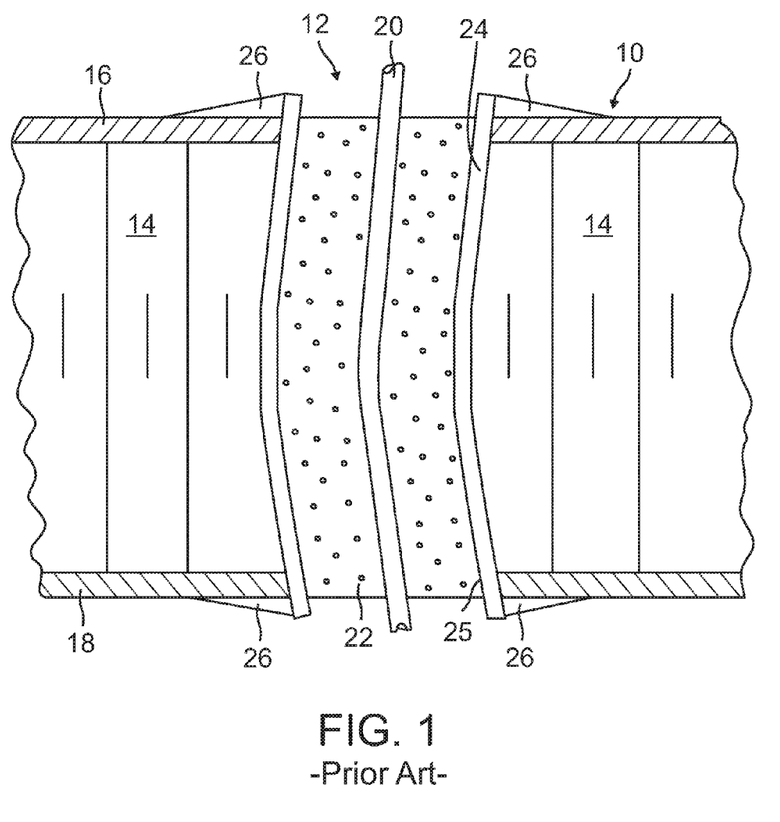
FIG. 1 is a partial cross-sectional view of a panel incorporating a feedthrough, comprising a short length of insulated wire, in accordance with the prior art.

FIG. 1 is a partial cross-sectional view of a panel 10 incorporating a feedthrough 12 in accordance with the prior art. The panel 10 can comprise, for example, a solar cell panel having a honeycomb core 14 made of, e.g., an aluminum alloy, that is sandwiched between two opposite face sheets 16 and 18. In one possible configuration, one surface or side, e.g., a top or front side, of the panel 10 can be populated with solar cells (not illustrated), while the opposite, bottom or backside of the panel 10 can incorporate associated wiring for the cells. Since these wires pass through the panel 10, and because the honeycomb core 14 can exhibit sharp edges and be electroconductive, they need to be protected from sharp edges possible through the panel 10 and around the termination hole.

In one example, illustrated in FIG. 1, the wires conveying electrical signals between the cells and the backside wiring are conveyed through the panel 10 by means of a conventional feedthrough 12. The conventional feedthrough 12 comprises a short length of tubing 25 that is inserted through a through-opening 24 formed, e.g., by drilling or another process, through the panel 10, and then bonded with an adhesive 26 to adjacent ones of the face sheets 16 and 18 at the opposite ends of the through-opening 24. An electroconductive wire 20, e.g., copper, which can be either uninsulated or surrounded by a jacket 22 of an insulating material, is then passed through the lumen of the tubing 25 from the front side to the back side of the panel 10.

Installation of the tubing within the through-opening 24 requires manual labor to custom cut each piece to the thickness of the panel 10. Additionally, installation of the tubing requires the use of an adhesive, with its related complications of mess, mixing, open times, and curing requirements. What is needed then are feedthroughs that are reliable, inexpensive, and simple to install, that protect wires passing through them from sharp edges in the panel and around the termination hole, and optionally, that can include electroconductive paths 236, 238 that enable a signal to pass through the panel without the use of separate, discrete wires.

Figure 2A:
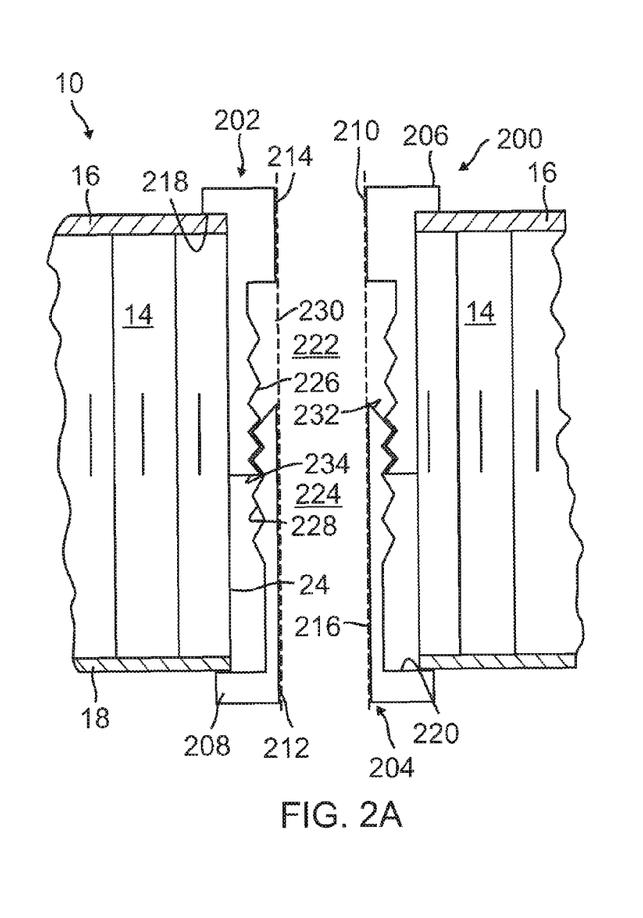
FIG. 2A is a partial cross-sectional view of a panel incorporating an example of a feedthrough in accordance with the present disclosure.
Figure 2B:
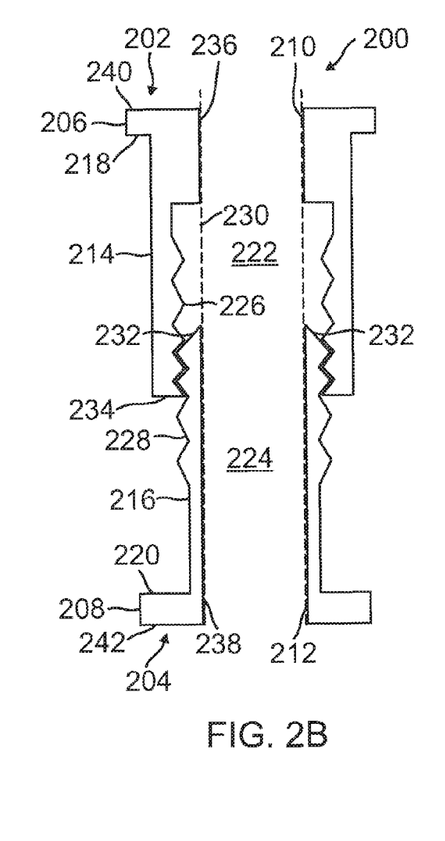
FIG. 2B is a cross-sectional view of an alternative example feedthrough of FIG. 2A, showing an optional electroconductive path extending therethrough.

FIG. 2A is a partial cross-sectional view of a panel 10 incorporating an example of a two-piece, snap-together feedthrough 200 in accordance with the present disclosure, and FIG. 2B is a cross-sectional view of an alternative of the example feedthrough 200 of FIG. 2A, showing an optional electroconductive path extending through a common lumen 230 of the feedthrough 200 continuously from one end thereof to the other.

As illustrated in FIGS. 2A and 2B, the feedthrough 200 comprises first and second parts 202 and 204. Each part 202 and 204 includes an associated flange 206 or 208 with an opening 210 or 212 extending therethrough. A tubular segment 214 or 216 extends normally from a first surface 218 or 220 of a corresponding one of the flanges 206 or 208, and each of the tubular segments 214 and 216 has a corresponding lumen 222 or 224 disposed generally concentrically with the corresponding opening 210 or 212.

Of importance, the tubular segments 214 and 216 of each of the first and second parts 202 and 204 further include a pair of complementary engaging mechanisms 226 and 228, which are respectively disposed on a distal end portion, i.e., an end portion opposite the corresponding flange 206 or 208, of an associated one of the tubular segments 214 or 216. As illustrated in FIG. 2A, the engaging mechanisms 226 and 228 are configured to engage each other and couple the first and second parts 202 and 204 together through an opening 24 in a panel 10 having opposite sides or surfaces in a snap-together fashion, such that the first surface 218 or 220 of each of the flanges 206 and 208 is held against a corresponding one of the opposite surfaces of the panel 10, and the lumens 222 and 224 of respective ones of the tubular segments are disposed generally concentrically with each other so as to form a "common lumen" 230 (indicated by the dashed lines in FIGS. 2A and 2B) that extends completely through the feedthrough 200, and hence, the panel 10.

In the example illustrated in FIGS. 2A and 2B, the complementary engaging mechanisms 226 and 228 respectively comprise a set of radially protruding teeth extending circumferentially around an inner circumferential surface of the tubular segment 214 of the first part 202, and a corresponding set of radially protruding teeth extending circumferentially around an outer circumferential surface of the tubular segment 216 of the second part 204.

Additionally, in some examples, the radially protruding teeth of the two parts 202 and 204 can comprise complementary helical threads disposed on respective ones of the tubular segments 214 and 216 instead of discrete teeth, which can either snap together longitudinally, as described above, or alternatively, screw together longitudinally, in the manner of a conventional nut and bolt.

In the illustrated example of FIGS. 2A and 2B, the first and second parts 202 and 204 are also shown as being generally cylindrical in shape. However, as those of some skill will understand, the cross-sectional shape of the two parts 202 and 204, including the flanges 206 an 208 can, like the thorough-opening 24 itself, have other shapes, e.g., polygonal or elliptical, depending on the particular application at hand. Also, as those of some skill may note, in the illustrated example feedthrough 200 of FIGS. 2A and 2B, the tubular segment 214 of the first part 202 is illustrated as having an outer diameter corresponding to the diameter of the through-opening 24 of the panel 10, whereas, the outer diameter of the tubular segment 216 of the second part 204 is sized to enable it to slide coaxially into the lumen 222 of the tubular segment 214 of the first part 202. However, as discussed below in connection with other possible examples, it is also possible to configure the tubular segments 214 and 216 to have the same or substantially similar outside and/or inside diameters or widths, and as to the engaging mechanisms of the examples, these can be disposed either symmetrically or asymmetrically with respect to both longitudinal and/or transverse planes of the feedthroughs, again, depending on the application at hand.

As illustrated in FIGS. 2A and 2B, the distal end of the tubular segment 216 of the second part 204 can be provided with a tapered surface 232 such that, when it is pushed into abutment with the opposing surface 234 of the distal end of the tubular segment 214 of the first part 202, the tapered surface 232 compresses or deflects the side walls of the distal end portion of the tubular segment 216 of the second part 204 radially inward, and/or expands the side walls of the distal end portion of the tubular segment 214 of the first part 202 radially outward, such that the respective teeth of the engaging mechanisms can slide up and over one another sequentially in a longitudinal direction as the two parts 202 and 204 are pushed together within the through-opening 24. Of course, the tapered surface 232 can alternatively be located on the distal end of the tubular segment 214 of the first part 202, or indeed, both distal ends of the tubular segments 214 and 216 can be provided with complementary beveled or tapered surfaces to effect the foregoing radial expansion/compression function. Additionally or in the alternative, as discussed below in connection with some alternatives, other features can be implemented in the sidewalls of the tubular segments 214 and 216 of the two parts 202 and 204 to facilitate their radial expansion and/or compression during engagement of the interdigitating teeth of the complementary engaging mechanisms 226 and 228.

As discussed above, one of the desired features of the novel feedthrough 200 is to provide electrical insulation between any electrical conductor extending through the feedthrough 200 and the panel 10 through which it extends. In this regard, it is advantageous to make the two parts 202 and 204 of a dielectric material, e.g., a strong plastic material, which can comprise a thermoplastic, such as Acrylonitrile Butadiene Styrene (ABS) or Nylon, or a thermosetting plastic material, e.g., polyurethane or an epoxy resin. As an example, plastic material suitable for a space flight environment could include WINDFORM XT, a polyamide-and-CARBOND composite material. Generally speaking, materials intended for use in a space flight environment should be suitable for that environment, which can range between −150 degrees C. and +175 degrees C., and should exhibit low outgassing, and pass the ASTM E595-77/84/90 test. Advantageously, in some examples, the parts 202 and 204 can be molded using precision injection molding techniques, and if desired, can be reinforced with embedded fibers, e.g., glass, carbon, aramid, or boron fibers, for additional strength.

As discussed above, it can be desirable in some cases to provide an electroconductive path through the feedthrough 200 to enable a signal to be conveyed from one side of the panel 10 to the other without resorting to the insertion of a conductive wire through the feedthrough 200. As illustrated in FIG. 2B, this can be advantageously achieved by providing a pair of electroconductive paths 236 and 238 respectively disposed on the interior surface of an associated one of the lumens 222 and 224 of the two tubular segments 214 and 216, and arranging them such that the two electroconductive paths 236 and 238 are electroconductively coupled to each other when the first and second parts 202 and 204 are coupled together through the through-opening 24.

As illustrated in the particular example of FIG. 2B, the formation of the two electroconductive paths 236 and 238 can comprise plating respective ones of their inner surfaces with an electroconductive metal plating, e.g., gold or copper, or alternatively, molding a metal foil or insert into the interior wall surfaces, such that when the respective teeth of the two engaging mechanisms 226 and 228 are interdigitated with each other during installation, at least a portion of the conductive path 238, for example, that disposed on the tapered surface 232 of the distal end of the tubular segment 216, is disposed in an electroconductive mechanical contact with the other electroconductive path 236.

Of course, other implementations of the electroconductive paths 236 and 238 are possible. For example, the electroconductive paths 236 and 238 could comprise longitudinal bands of a conductive metal respectively disposed on the interior surfaces of the two tubular segments 214 and 216, having respective ends that couple to each other during installation of the feedthrough 200. In such an example, it might be desirable to provide an indexing mechanism, such as a complementary longitudinal tongue-and-groove arrangement discussed below, that is configured to orient the first and second parts 202 and 204 at a selected angular position relative to each other when the first and second parts 202 and 204 are coupled together through the through-opening 24, such that the respective ends of the two conductive bands are disposed in alignment with each other.

In the particular example of FIG. 2B, each of the flanges 206 and 208 of the first and second parts 202 and 204 includes a second surface 240 or 242 that is opposite to the corresponding first surface 218 or 220 thereof, and each of the electroconductive paths 236 and 238 extends to a corresponding one of the second surfaces 240 or 242. The provision of these two conductive surfaces 240 and 242 enables electrical connections, such as a solder joint or a weld joint, to be made to components or wiring respectively disposed on the opposite surfaces of the panel 10 without having to make them within the more constricted common lumen 230 of the installed feedthrough 200.

Figure 3A:
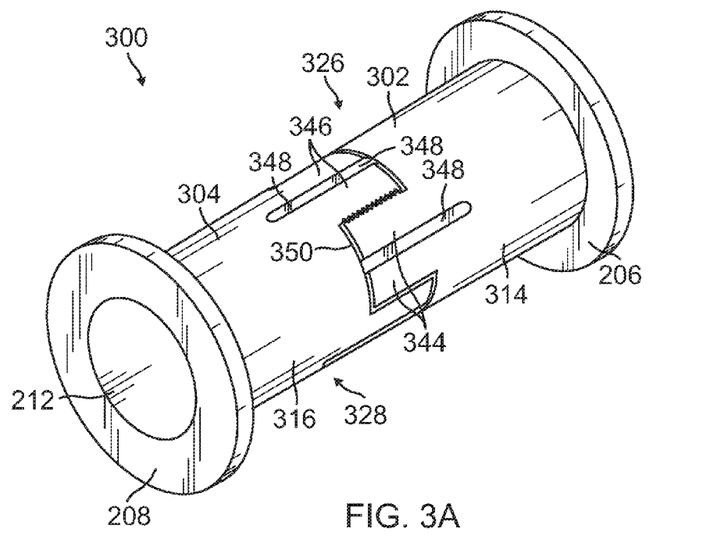
FIG. 3A is an end-and-side perspective view of another example of a feedthrough in accordance with the present disclosure.
Figure 3B:
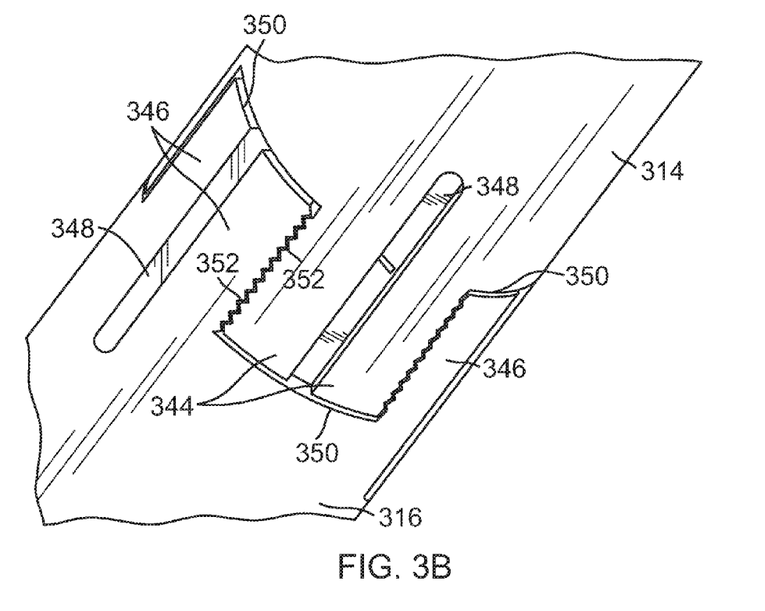
FIG. 3B is an enlarged side perspective view of a middle portion of the example feedthrough of FIG. 3A.
Figure 3C:
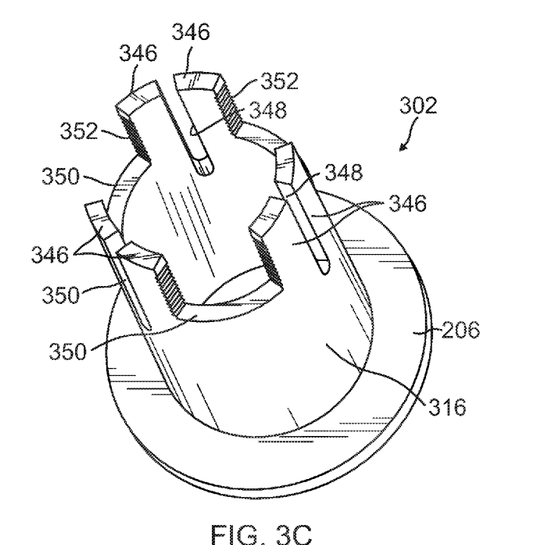
FIG. 3C is a distal-end-and-side and perspective view of a part of the feedthrough of FIG. 3A.
Figure 3D:
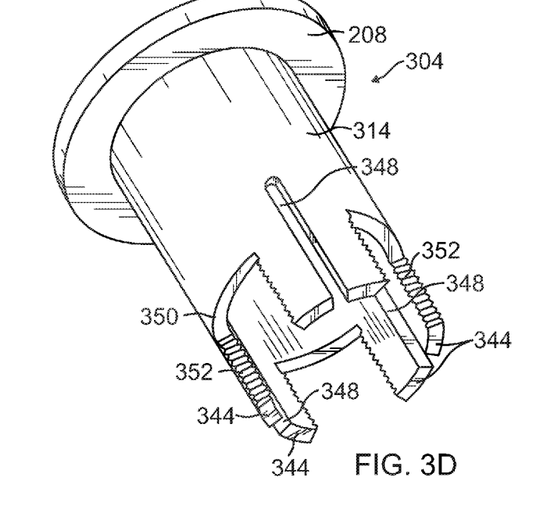
FIG. 3D is a distal-end-and-side perspective view of another part of the feedthrough of FIG. 3A.

FIG. 3A is an end-and-side perspective view of another example of a feedthrough 300 in accordance with the present disclosure. FIG. 3B is an enlarged side perspective view of a middle portion of the example feedthrough of FIG. 3A, and FIGS. 3C and 3D are distal-end-and-side and perspective view of first and parts 302 and 304 of the feedthrough of FIG. 3A. As can be seen in these figures, the example feedthrough 300 is similar in many respects to the example feedthrough 200 of FIGS. 2A and 2B, and differs from the former primarily in the manner in which the complementary engaging mechanisms 326 and 328 are implemented.

In particular, it may be noted that the respective inner and outer diameters of the two tubular segments 314 and 316 are the same, and as illustrated in, e.g., FIG. 3B, the engaging mechanisms 326 and 328 comprise complementary castellations 344 and 346 respectively formed at the distal ends of associated ones of the two tubular segments 314 and 316. Each castellation 344 or 346 engages within a complementary notch 350 in the distal end of the other part 302 or 304. Additionally, each castellation 344 and 346 is bifurcated by a longitudinal slot 348 that extends rearwardly from a corresponding distal end thereof. As discussed above, the longitudinal slots 348 enable the distal ends of the halves of the associated castellations 344 or 346 to spring sideways, i.e., in a circumferential direction, such that respective groups 352 of longitudinally extending, circumferentially protruding teeth disposed on opposing side surfaces of the castellation halves can spring into interdigitated engagement with each other when the two parts 302 and 304 are pushed into engagement with each other longitudinally. It may be noted that, in this example, the two parts 302 and 304 are identical to each other, thereby enabling a reduction in the number of parts, and hence, the cost of the feedthrough 300, to be achieved.

Figure 4A:
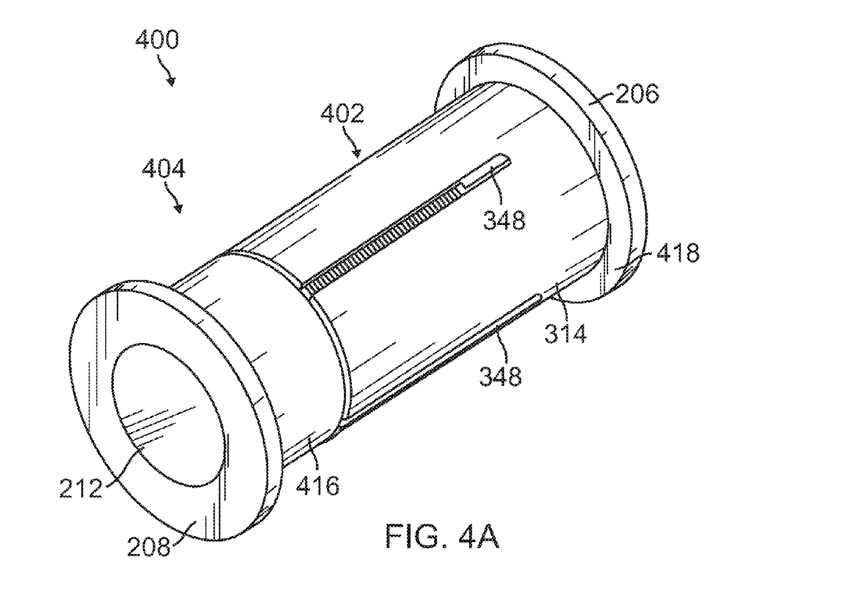
FIG. 4A is an end-and-side perspective view of another example of a feedthrough.
Figure 4B:
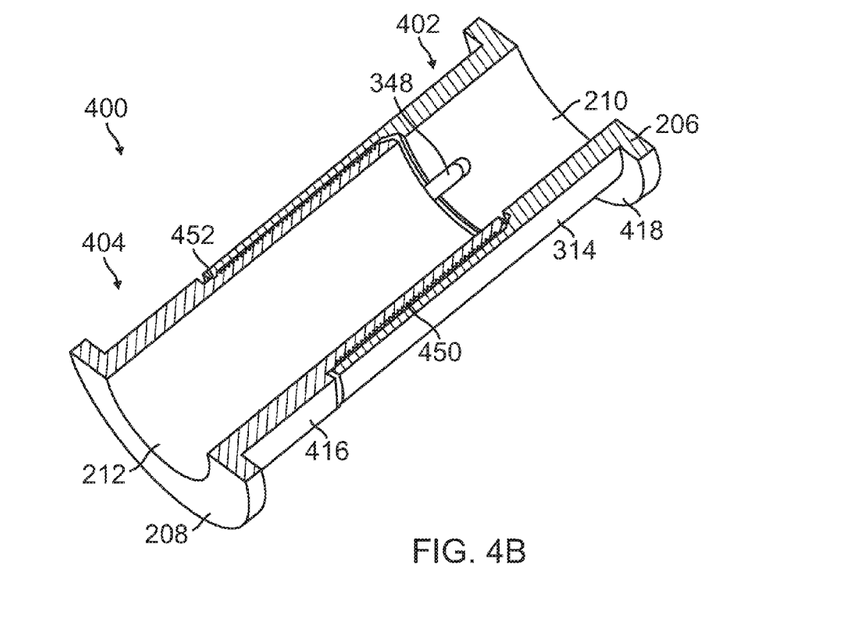
FIG. 4B is a cross-sectional end-and-side perspective view of the example feedthrough of FIG. 4A.
Figure 4C:
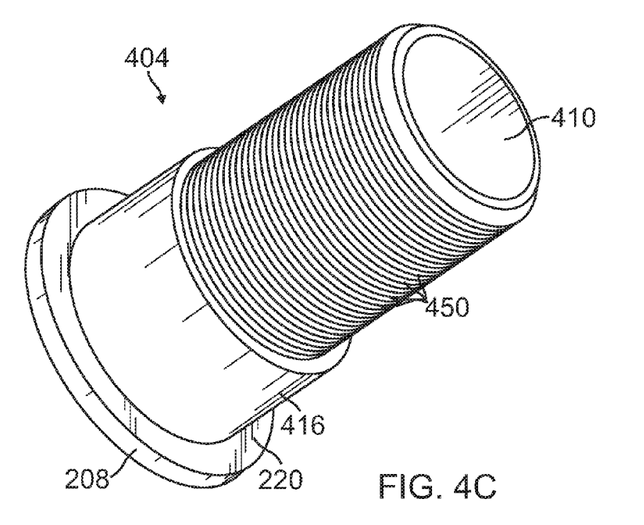
FIG. 4C is a distal-end-and-side perspective view of a part of the feedthrough of FIG. 4A.
Figure 4D:
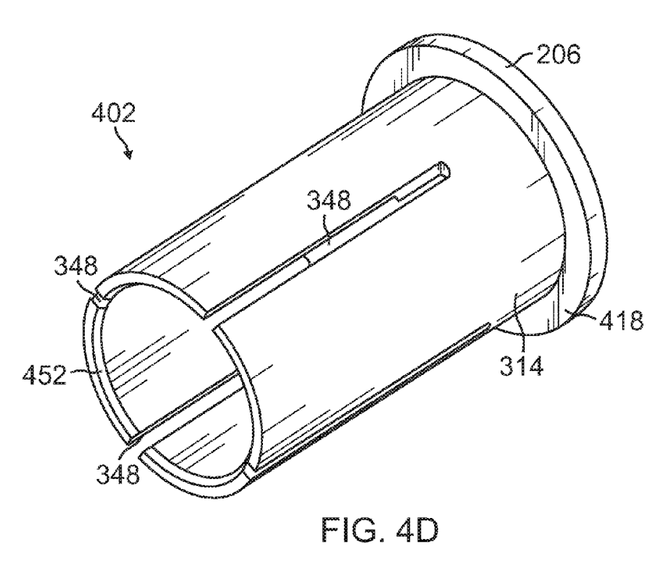
FIG. 4D is a distal-end-and-side perspective view of another part of the feedthrough of FIG. 4A.

FIG. 4A is an end-and-side perspective view of another example of a feedthrough 400 in accordance with the present disclosure. FIG. 4B is a cross-sectional end-and-side perspective view of the example feedthrough of FIG. 4A, and FIGS. 4D and 4C are distal-end-and-side perspective view of first and second parts 402 and 404 of the feedthrough of FIG. 4A, respectively, This example feedthrough 400 is somewhat similar to that of FIG. 3, except as regards the complementary engaging mechanisms. In this example, the respective inner and outer circumferential side walls of the distal end portions of the tubular segments 416 and 418 are both reduced in thickness to respectively accommodate a group 450 of circumferentially extending, radially protruding teeth, in the case of the second part 404, or a single circumferentially extending, radially protruding tooth 452, in the case of the first part 402, that interdigitate when the two parts 402 and 404 are pushed together in the through-opening 24. In one example of FIG. 4, the teeth of the group 450 on the second part 404 protrude radially inward, whereas, the single tooth 452 protrudes radially outward.

Figure 5:
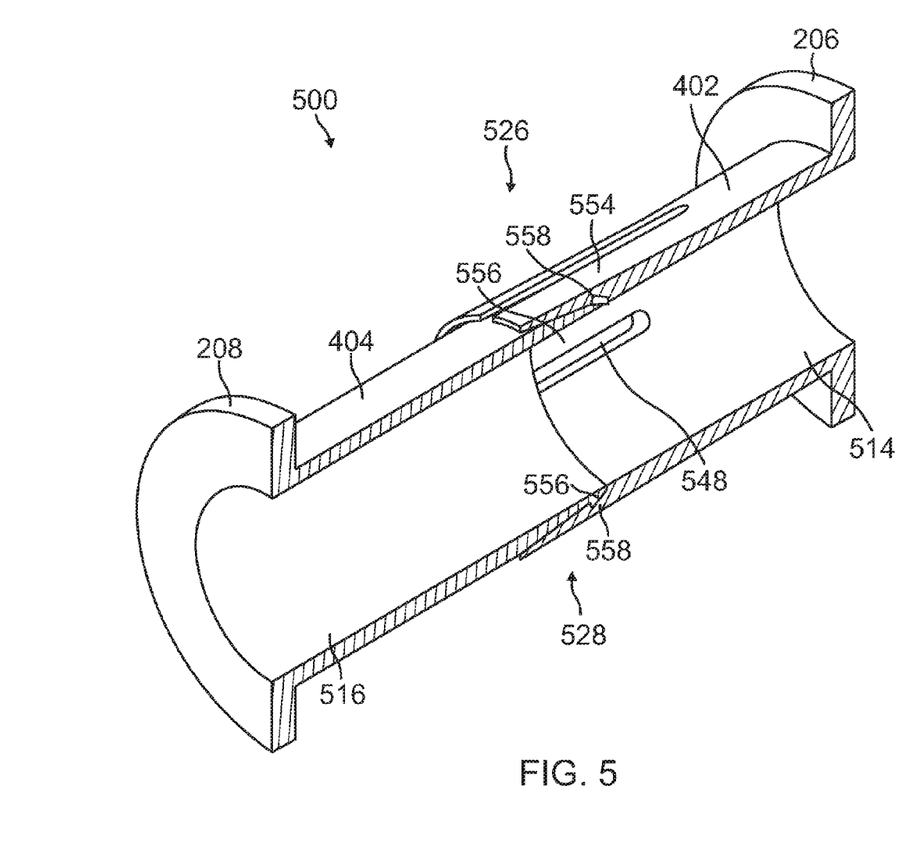
FIG. 5 is a cross-sectional end-and-side perspective view of another example of a feedthrough.

FIG. 5 is a cross-sectional end-and-side perspective view of another example feedthrough 500. The example feedthrough 500 is similar to the previously described examples, except that the complementary engaging mechanisms 526 and 528 comprise fingers 554 that extend longitudinally from the distal ends of associated ones of the tubular segments 514 and 516 and past the distal end of the other one of the tubular segments 514 or 516. As illustrated in FIG. 5, each of these fingers 554 can be defined by a pair of longitudinally extending slots 548 disposed in the side walls of a corresponding one of the tubular segments 514 and 516, as discussed above, to enable the fingers 554 to bend in the radial direction, and each of the fingers 554 can include a radially extending tooth 556 at its distal end that engages within a corresponding, complementary groove 558 in the sidewall of the other tubular segment 514 or 516.

A feature of this example is the ability for the outward diameter of one part to pass through the panel 10 face sheets 16 or 18 in an unexpanded state and then expand to engage the other part. This enables the through-opening 24 in the panel 10 to be the same diameter as the unexpanded outer diameter of the tubular segments 514 and 516, thus minimizing the size of the through-opening 24 that is needed in the panel 10.

Figure 6A:
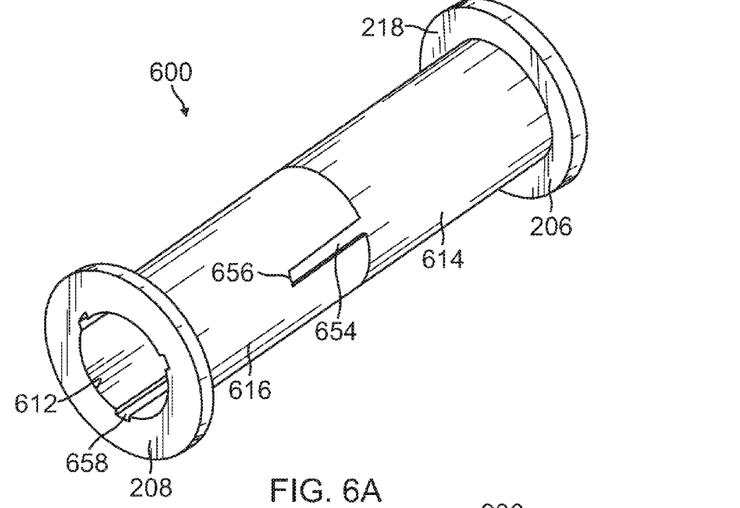
FIG. 6A is an end-and-side perspective view of another example of a feedthrough.
Figure 6B:
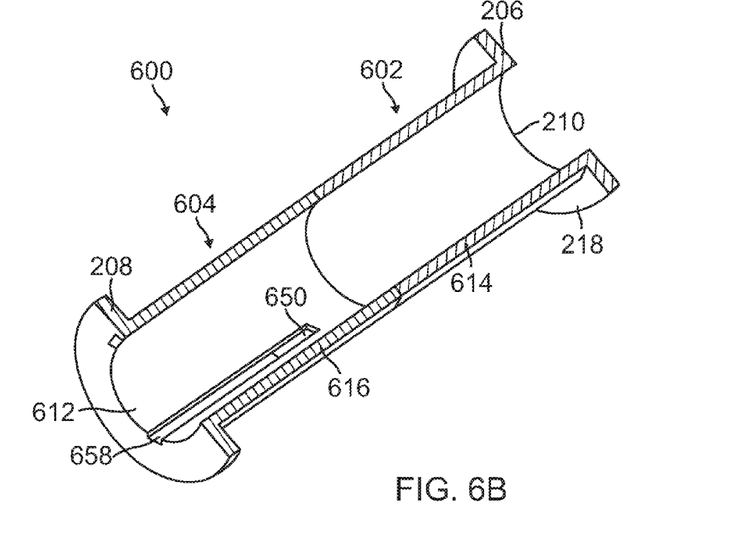
FIG. 6B is a cross-sectional end-and-side perspective view of the example feedthrough of FIG. 6A.
Figure 6C:
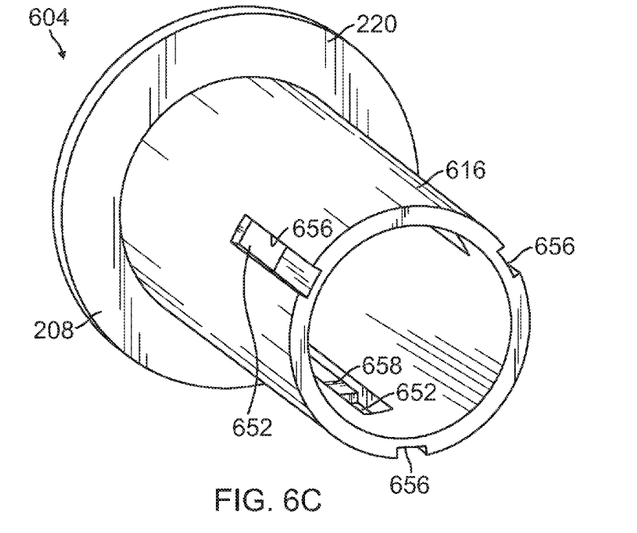
FIG. 6C is a distal-end-and-side perspective view of a part of the feedthrough of FIG. 6A.
Figure 6D:
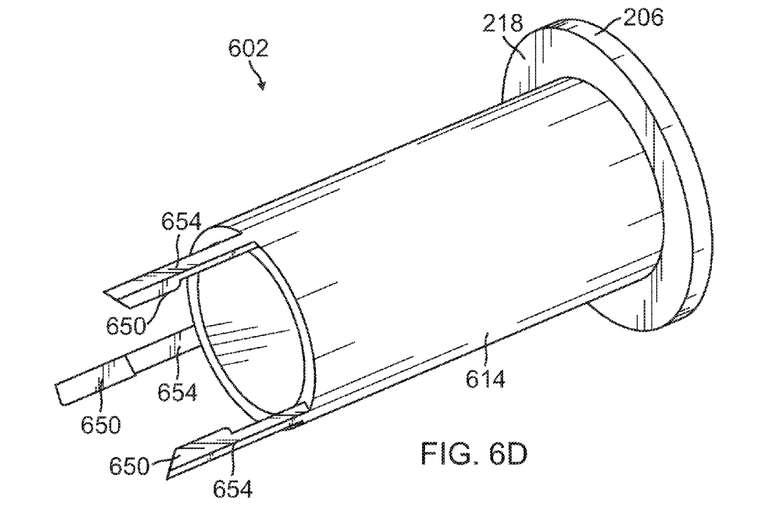
FIG. 6D is a distal-end-and-side perspective view of another part of the feedthrough of FIG. 6A; and, FIG. 7 is a functional block diagram of an example method for using the novel feedthroughs of the present disclosure.

FIG. 6A is an end-and-side perspective view of another example of a feedthrough 600. FIG. 6B is a cross-sectional end-and-side perspective view of the example feedthrough 600 of FIG. 6A, and FIGS. 6D and 6C are distal-end-and-side perspective views of a first and second part 602 and 604 of the feedthrough 600, respectively.

The feedthrough 600 is similar to that of FIG. 5, except that the longitudinal fingers 654 extending longitudinally from the distal end of the tubular segment 614 of the first part 602 are received in corresponding longitudinal slots 656 disposed in the outer circumferential surface of the distal end portion of the tubular segment 616 of the second part 604. Additionally, as can be seen in the cross-sectional view of FIG. 6B, the distal end portion of each longitudinal finger 654 is provided with a radially extending tooth 650 that is received in a corresponding through-slot 652 in the sidewall of the tubular segment 616 of the second part 604 in an over-center locking type of engagement. Additionally, as seen in, e.g., FIG. 6A, a plurality of slots 658 respectively extend longitudinally in the inner circumferential surface of the tubular segment 616 of the second part 604 from the associated flange opening 612 and into corresponding ones of the through-slots 652. The internal longitudinal slots 658 enable a tool (not illustrated) inserted in the flange opening 612 of the second part 604 to depress the respective teeth 650 of the longitudinal fingers 654 out of engagement with their respective through-slots 652 so that the feedthrough 600 can be easily uninstalled from a panel 10 within which it has been assembled.

Figure 7:
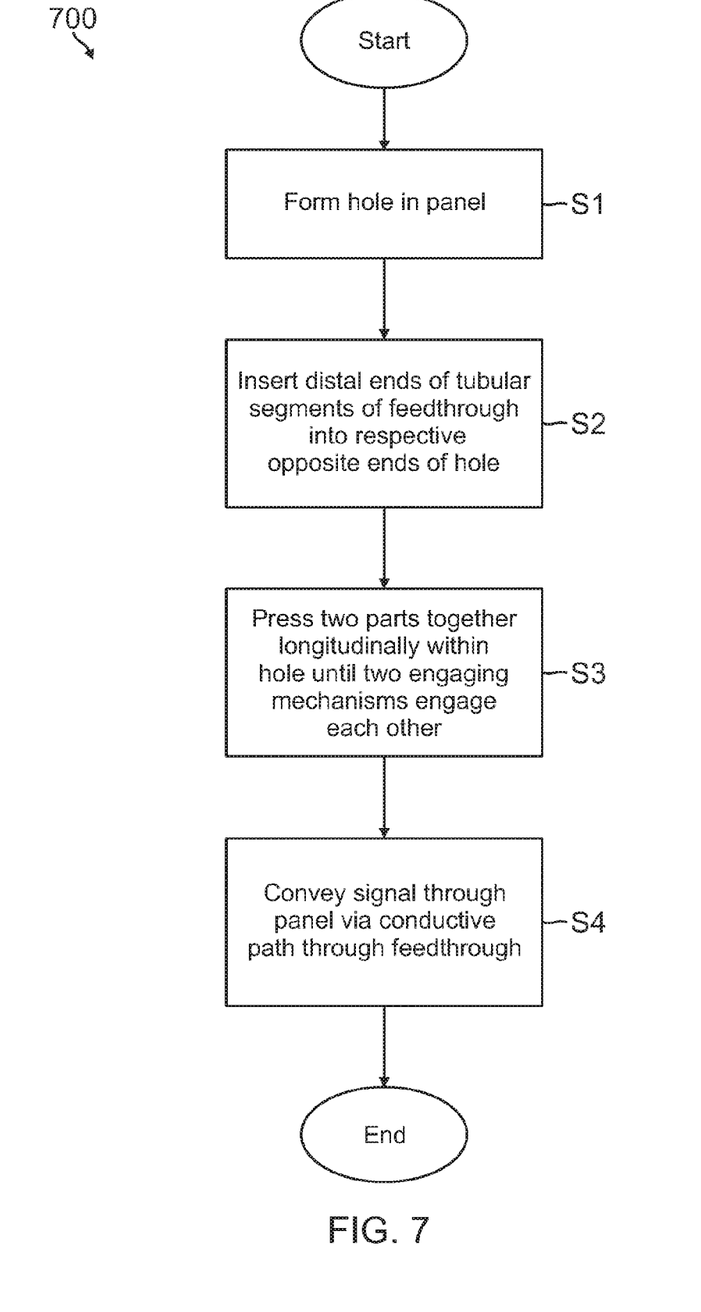

FIG. 7 is a functional block diagram of an example method 700 for using the novel feedthroughs of the present disclosure. Thus, at S1 of the example method 700, a hole is formed in a panel through which it is desirable to convey a signal, e.g., an electrical signal. At S2, of the method, distal ends of respective ones of the two feedthrough parts are inserted into corresponding ones of the opposite ends of the hole. At S3, the two parts of the feedthrough are pressed together longitudinally within the hole such that the complementary engaging mechanisms engage each other in a snap-together fashion, such that the first surface of each of the flanges of the two parts is held against a corresponding one of the opposite surfaces of the panel, and the lumens of respective ones of the tubular segments are disposed generally concentrically with each other to form a common lumen of the installed feedthrough. At S4, the signal is conveyed through common lumen of the feedthrough via, in one case, an electroconductive wire inserted through the common lumen, or alternatively, through a conductive path disposed on the interior surface of the common lumen, as discussed above.

As those of some skill in this art will by now appreciate, and depending on the particular application at hand, many modifications, substitutions and variations can be made in and to the materials, apparatus, configurations and methods of the present disclosure without departing from the spirit and scope thereof. In light of this, the scope of the present invention should not be seen as limited to those of the particular embodiments illustrated and described herein, as they are merely by way of some examples thereof, but rather, should be fully commensurate with that of the claims appended hereafter and their functional equivalents.

What is claimed is:

1. A feedthrough, comprising:
   first and second parts, each including a flange with an opening therethrough, and a tubular segment extending normally from a first surface of the flange and having a lumen disposed generally concentrically with the opening; and
   a pair of complementary engaging mechanisms, each disposed on a distal end portion of a respective one of the tubular segments and configured to couple the first and second parts together through an opening in a panel having opposite sides in a snap-together fashion, such that:
   the first surface of each of the flanges is held adjacent to a corresponding one of the opposite surfaces of the panel; and
   the lumens of respective ones of the tubular segments are disposed generally concentrically with each other.

2. The feedthrough of claim 1, wherein at least one of the first and second parts comprises a dielectric material.

3. The feedthrough of claim 1, wherein at least one of the first and second parts comprises a plastic material.

4. The feedthrough of claim 3, wherein the plastic material comprises a thermoplastic or a thermosetting plastic.

5. The feedthrough of claim 3, wherein the plastic material is reinforced with embedded fibers.

6. The feedthrough of claim 1, wherein at least one of the engaging mechanisms comprises at least one radially protruding tooth.

7. The feedthrough of claim 1, wherein at least one of the engaging mechanisms comprises at least one finger extending longitudinally from a distal end of an associated one of the tubular segments and past a distal end of the other one of the tubular segments.

8. The feedthrough of claim 1, wherein at least one of the engaging mechanisms comprises castellations formed at a distal end of an associated one of the tubular segments.

9. The feedthrough of claim 1, wherein at least one of the engaging mechanisms comprises a corresponding one of the tubular segments having a slot extending rearwardly from a distal end thereof.

10. The feedthrough of claim 1, further comprising, a pair of electroconductive paths, each disposed on an interior surface of a respective one of the lumens, wherein the electroconductive paths are electroconductively coupled to each other when the first and second parts are coupled together through the opening.

11. The feedthrough of claim 1, further comprising an indexing mechanism configured to orient the first and second parts at a selected angular position relative to each other when the first and second parts are coupled together through the opening.

12. The feedthrough of claim 10, wherein
each of the flanges of the first and second parts includes a second surface opposite to the first surface thereof, and
each of the electroconductive paths extends to a corresponding one of the second surfaces.

13. The feedthrough of claim 10, wherein at least one of the electroconductive paths comprises a metal plating.

14. The feedthrough of claim 1, wherein at least one of the engaging mechanisms comprises one or more radially protruding teeth.

15. A method, comprising:
inserting first and second parts of a feedthrough into opposite ends of a hole extending through a panel, each of the first and second parts including
a flange having an opening therethrough,
a tubular segment extending normally from a first surface of the flange,
a lumen disposed generally concentrically with the opening, and
one of a pair of complementary engaging mechanisms, each disposed on a distal end portion of a corresponding one of the tubular segments and configured to couple the first and second parts together when pressed into longitudinal engagement with each other; and
urging the first and second parts towards each other longitudinally through the hole such that the engaging mechanisms engage each other in a complementary snap-together fashion and couple the first and second parts together through the opening, the first surface of each of the flanges is held adjacent to a corresponding one of the opposite sides of the panel, and the respective lumens of the tubular segments are disposed generally concentrically with each other.

16. The method of claim 15, wherein the urging comprises interdigitating at least one radially protruding tooth on one of the first and second parts with a plurality of radially protruding teeth on the other one of the first and second parts.

17. The method of claim 16, wherein the interdigitating comprises screwing the at least one radially protruding tooth into the plurality of radially protruding teeth.

18. The method of claim 15, further comprising conveying an electrical signal through the feedthrough from one side of the panel to the other side thereof.

19. The method of claim 18, wherein the conveying comprises inserting an electroconductive wire through the concentric lumens of the tubular segments of the first and second parts.

20. The method of claim 18, wherein the conveying comprises:
disposing one of a pair of electroconductive paths on an interior surface of each of the lumens of the tubular segments; and
coupling the first and second parts to each other through the hole in the panel such that the electroconductive paths are electroconductively connected to each other.

* * * * *